(12) United States Patent  
Harris et al.

(10) Patent No.: US 8,875,746 B2  
(45) Date of Patent: Nov. 4, 2014

(54) TEXTILE SLEEVE WITH TWISTED HYBRID FILL YARN AND METHOD OF CONSTRUCTION THEREOF

(71) Applicant: Federal-Mogul Powertrain, Inc., Southfield, MI (US)

(72) Inventors: David Harris, Coatesville, PA (US); Cassie Malloy, Blue Bell, PA (US); Ellen Bacon, Blue Bell, PA (US); Danny Winters, Downingtown, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 37 days.

(21) Appl. No.: 13/633,528

(22) Filed: Oct. 2, 2012

(65) Prior Publication Data

US 2014/0090739 A1 Apr. 3, 2014

(51) Int. Cl.
*H01B 5/12* (2006.01)
*D03D 3/02* (2006.01)
*D03D 15/00* (2006.01)
*D03D 3/00* (2006.01)
*D02G 3/44* (2006.01)

(52) U.S. Cl.
CPC ............ *D03D 15/0027* (2013.01); *D02G 3/441* (2013.01)
USPC ............... 139/384 R; 139/387 R; 139/420 R; 139/426 R; 139/420 A

(58) Field of Classification Search
CPC .... H01B 11/06; H01B 11/1091; H01B 11/04; H01B 11/10; H01B 11/1025; H01B 11/085; H01B 11/02; H01B 7/0838; H01B 11/1033; H01B 11/1066; H01B 7/0892; H01B 9/003; H01B 5/12; H01B 7/185; H01B 7/186; H01B 9/006; H01B 19/00; H01B 7/0823; H01B 7/1875; H01B 11/1813; H01B 11/183; H01B 1/04; H01B 7/00; H01B 9/023; H01B 3/308; H01B 5/08; H01B 7/0045; H01B 7/06; H01B 7/368; H01B 7/0208; H01B 7/225; H01B 7/28; H01B 7/0266; H01B 7/0291; H01B 7/083; H01B 7/1865; H01B 7/187; H01B 7/303
See application file for complete search history.

(56) References Cited

U.S. PATENT DOCUMENTS 2,107,467 A * 2/1938 Buhler .............................. 87/6
2,662,560 A * 12/1953 Jackson ....................... 139/401

(Continued)

FOREIGN PATENT DOCUMENTS

| JP | 2004190194 A | 7/2004 |
| WO | 2007117883 A2 | 10/2007 |
| WO | 2011028460 A2 | 3/2011 |

OTHER PUBLICATIONS

International Search Report mailed Dec. 12, 2013 (PCT/US2013/062547).

*Primary Examiner* — Bobby Muromoto, Jr.
(74) *Attorney, Agent, or Firm* — Robert L. Stearns; Dickinson Wright, PLLC

(57) ABSTRACT

A textile sleeve for routing and protecting elongate members and method of construction thereof is provided. The sleeve includes an elongate wall having opposite edges extending parallel to a central axis. The wall is woven with warp yarns extending parallel to the axis and hybrid fill yarns extending transversely to the warp yarns. The hybrid fill yarns are provided having a yarn filament core and non-metallic first and second yarn filaments overlying the yarn filament core. The first yarn filament is twisted about the yarn filament core in a first helical direction and the second multifilament yarn is twisted over the first yarn filament and about the yarn filament core in a second helical direction. The first helical direction and the second helical direction being opposite one another to provide a resultant zero torque on the yarn filament core.

18 Claims, 2 Drawing Sheets

(56) References Cited

U.S. PATENT DOCUMENTS

| | | |
|---|---|---|
| 3,656,288 A | 4/1972 | Gilchrist |
| 3,785,136 A | 1/1974 | Tecce et al. |
| 3,824,776 A | 7/1974 | London, Jr. |
| 4,004,329 A | 1/1977 | London, Jr. et al. |
| 4,231,219 A | 11/1980 | Griset, Jr. |
| 4,383,131 A * | 5/1983 | Clabburn .................... 174/73.1 |
| 5,131,064 A * | 7/1992 | Arroyo et al. ................ 385/102 |
| 6,537,640 B1 | 3/2003 | Nakamura et al. |
| 7,155,891 B2 | 1/2007 | Bader |
| 7,493,747 B2 | 2/2009 | Bader |
| 7,576,286 B2 * | 8/2009 | Chen ........................ 174/117 M |
| 8,030,570 B2 * | 10/2011 | Seraj et al. .................. 174/88 C |
| 2004/0011087 A1 | 1/2004 | Rebouillat |
| 2004/0173368 A1 * | 9/2004 | Dickson ....................... 174/35 C |
| 2007/0233175 A1 * | 10/2007 | Zaver et al. .................... 606/200 |
| 2010/0084179 A1 * | 4/2010 | Harris et al. ................... 174/350 |
| 2011/0088925 A1 * | 4/2011 | Tatsumi et al. .................. 174/69 |
| 2011/0174519 A1 * | 7/2011 | Shah et al. .................. 174/119 C |
| 2012/0097604 A1 * | 4/2012 | Cote et al. ................ 210/500.23 |
| 2012/0247800 A1 * | 10/2012 | Shah et al. ....................... 174/36 |
| 2013/0105215 A1 * | 5/2013 | Morris et al. .................. 174/394 |
| 2014/0004296 A1 * | 1/2014 | Khokar .......................... 428/104 |

* cited by examiner

TEXTILE SLEEVE WITH TWISTED HYBRID FILL YARN AND METHOD OF CONSTRUCTION THEREOF

BACKGROUND OF THE INVENTION

1. Technical Field

This invention relates generally to textile sleeves for protecting elongate members, and more particularly to woven sleeves.

2. Related Art

It is known to wrap wires, wire harnesses, and conduit of various types in protective sleeves, such as in automobiles, aircraft or aerospace craft, to provide protection to the wires against abrasion, fluid and thermal affects. In order to achieve the desired protection and function, the protective sleeve may have a wall with multiple layers, with one layer being constructed to provide a certain function while another layer being constructed to provide a different function. For example, one layer may be constructed to impart a self-curling bias on the wall of the sleeve to maintain the wall in a self-curled (cigarette wrapped) configuration, while another layer may be constructed to provide enhanced coverage for the elongate member contained within a cavity of the sleeve. Unfortunately, although the aforementioned multilayer sleeves may perform satisfactorily and provide suitable protection against the various environmental conditions, they are generally difficult to construct since the walls are constructed having different material type yarns from one another. In addition, with the separate layers having different material yarns from one another, it is not possible to have each wall contribute uniformly to a common function, and thus, each wall inherently is limited to the specific function of its particular yarn type.

SUMMARY OF THE INVENTION

One aspect of the invention provides a woven sleeve for routing and protecting elongate members. The sleeve has an elongate wall having opposite edges extending parallel to a central axis of the sleeve. The wall is woven with warp yarns extending parallel to the axis and hybrid fill yarns extending transversely to the warp yarns. The hybrid fill yarns are provided having a yarn filament core and non-metallic first and second yarn filaments overlying the yarn filament core. The first yarn filament is twisted about the yarn filament core in a first helical direction and the second yarn filament is twisted over the first yarn filament and about the yarn filament core in a second helical direction. The first helical direction and the second helical direction being opposite one another to provide a resultant zero torque on the yarn filament core.

In accordance with another aspect of the invention, the yarn filament core is a thermoplastic monofilament.

In accordance with another aspect of the invention, the first and second yarns are multifilaments.

In accordance with another aspect of the invention, the monofilament fill yarn biases the wall into a self-curled configuration about said central axis.

In accordance with another aspect of the invention, the first yarn filaments are twisted having a first number of turns per inch about the yarn filament core and the second yarn filaments are twisted having a second number of turns per inch about the yarn filament core, the first number of turns per inch being greater than the second number of turns per inch.

In accordance with another aspect of the invention, the wall includes an inner layer and an outer layer overlying the inner layer, with the inner and outer layers having the warp yarns extending parallel to the axis and the hybrid fill yarns extending transversely to the warp yarns and having the same knit construction.

In accordance with another aspect of the invention, a method of constructing a textile sleeve is provided. The method includes In accordance with yet another aspect of the invention, the method includes weaving an elongate wall having opposite edges extending parallel to a central axis of the sleeve with warp yarns extending parallel to the axis and hybrid fill yarns extending transversely to the warp yarns. Further, providing the hybrid fill yarns having a yarn filament core and non-metallic first and second yarn filaments overlying the yarn filament core. The first yarn filament being twisted about the yarn filament core in a first helical direction and the second multifilament yarn being twisted over the first yarn filament and about the yarn filament core in a second helical direction, wherein the first helical direction and the second helical direction being opposite one another.

In accordance with yet another aspect of the invention, the method includes providing the yarn filament core as a thermoplastic monofilament.

In accordance with yet another aspect of the invention, the method includes providing the first and second yarns as multifilaments.

In accordance with yet another aspect of the invention, the method includes heat-setting the monofilaments to bias the wall into a self-curled configuration about the central axis.

In accordance with yet another aspect of the invention, the method includes twisting the first yarn filaments about the yarn filament core having a first number of turns per inch and twisting the second yarn filaments about the yarn filament core having a second number of turns per inch, wherein the first number of turns per inch being greater than the second number of turns per inch.

In accordance with yet another aspect of the invention, the method includes weaving the wall having an inner layer and an outer layer overlying the inner layer with the inner layer and the outer layer having the same knit construction.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
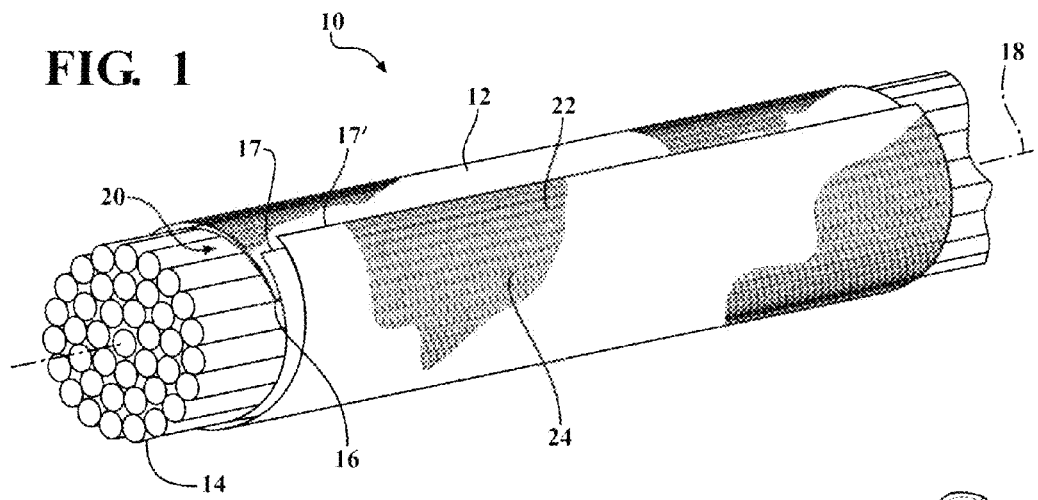
FIG. 1 is a schematic perspective view of a woven, self-wrapping sleeve constructed in accordance with one aspect of the invention.

Referring in more detail to the drawings, FIG. 1 shows schematic representation of a woven, self-wrapping textile sleeve, referred to hereafter as sleeve 10, constructed in accordance with one aspect of the invention. The sleeve 10 has a self-wrapping elongate wall 12 for routing and protecting elongate members, such as wires or a wire harness 14, for example, from exposure to abrasion and the ingress of contamination, debris and the like. The elongate wall 12 has opposite edges 16 and (17, 17') extending generally parallel to a central, longitudinal axis 18, wherein the edges 16, (17, 17') are preferably biased into overlapping relation with one another in "cigarette wrapped" fashion to fully enclose the elongate members 14 within a central cavity 20 of the sleeve. The cavity 20 is readily accessible along the full length of the longitudinal axis 18 so that the elongate members 14 can be readily disposed radially into the cavity 20, and conversely, removed from the cavity 20, such as during service. The wall 12 is woven with warp yarns 22 provided as monofilament or multifilament yarns and hybrid fill yarn 24. The hybrid fill yarn 24 provides additional, enhanced protection to the elongate members 14 against abrasion; exerts an enhanced static frictional force against the warp yarns 22 to inhibit sliding of the warp and hybrid fill yarn 22, 24 relative to one another, thereby avoiding the formation of unwanted openings in the wall 12; provides the bias to self-curl the opposite edges 16, (17, 17') in overlapping relation with one another, wherein the bias is imparted by heat-setting at least one of the yarn constituents of the hybrid fill yarn 24 into a curled configuration about the central axis 18, and provides multiple functionality to a single yarn construction, given the hybrid fill yarn 24 includes at least two dissimilar yarn materials twisted or served together.

Figure 3:
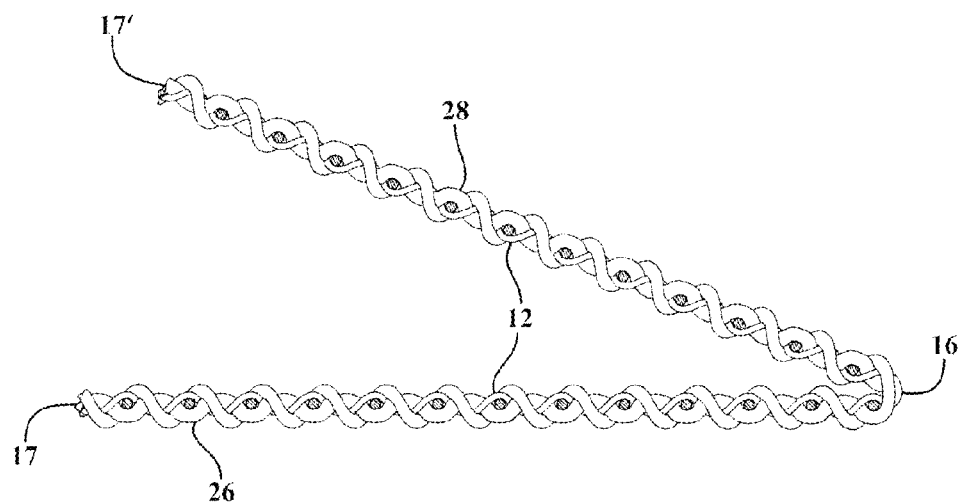
FIG. 3 is a schematic end view of the wall of the sleeve of FIG. 1 shown in an initially woven, non-heat-set state.

The wall 12 of the sleeve 10 is shown in FIGS. 1 and 3 as having dual first and second layers 26, 28, by way of example and without limitation. The first layer is an inner layer 26 and the second layer 28 is an outer layer overlying the first layer 26. The first and second layers 26, 28 are woven in a single continuous weaving process that utilizes the same yarn and weave pattern and are joined in the continuous weaving process to one another along their common edge 16. Accordingly, the first and second layers 26, 28 have the same weave construction. The first layer 26 extends from the edge 16 widthwise to its free edge 17, while the second layer 28 extends from the edge 16 widthwise to its free edge 17'. The first and second layers 26, 28 have the same or substantially the same width, and thus, the free edges 17, 17' are adjacent and radially aligned with one another.

Figure 2A:
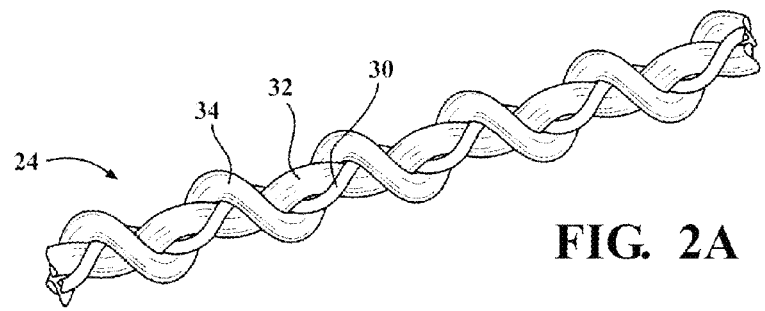
FIG. 2A is an enlarged partial view of a hybrid fill yarn of the sleeve of FIG. 1.
Figure 2:
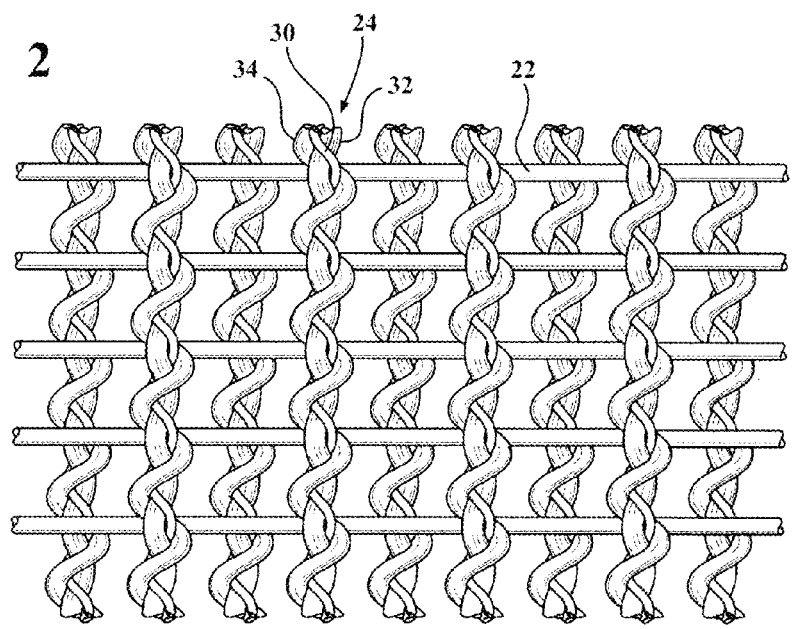
FIG. 2 is an enlarged partial view of the encircled area 2 of the wall of the sleeve of FIG. 1.

The hybrid fill yarn 24 performs multiple functions while being woven as a single yarn filament, thereby making the weaving process economical and efficient. As best shown in FIGS. 2 and 2A, the hybrid fill yarn 24, constructed in accordance with one aspect of the invention, has first, second and third yarn filaments 30, 32, 34. The first yarn filament 30 and second yarn filament 32 are first twisted with one another such that the second yarn filament 32 extends in a first helical direction, either in a S or Z twist direction, and the second yarn filament 34 is served over the first yarn filament 32 and about the yarn filament core 30 in a second helical direction, being in the opposite S or Z direction to the first yarn filament 32. Accordingly, the first helical direction and the second helical direction are opposite one another.

The first yarn filament 32 is a multifilament twisted having a first number of turns per inch (tpi) about the yarn filament core 30, such as about 4.0 tpi for example, and the second yarn filament 34 is a multifilament twisted having a second number of turns per inch about said yarn filament core, such as 3.2 tpi for example, such that the first number of turns per inch is greater than the second number of turns per inch. This relative ratio in turns per inch is important to make sure that the torque applied on the hybrid fill yarn 24 is zero, and thus, balanced. To further facilitate preventing relative movement between the warp yarns 22 and the hybrid fill yarn 24, the first and second yarn filaments 32, 34 can be texturized.

The hybrid yarn filament core 30 is provided as a heat-settable thermoplastic monofilament. The monofilament can be provided as any suitable heat-settable polymeric material, such as polyphenylene sulfide (PPS) or polyethyleneterephthalate (PET), for example.

Depending on the application needs, the wall 12 can be constructed having any suitable size, including length and diameter. When the wall 12 is in its self-wrapped tubular configuration, generally free from any externally applied forces, the edges 16, 17, 17' preferably overlap one another at least slightly to fully enclose the cavity 20, and thus, provide enhanced protection to the elongate member 14 contained in the cavity 20. The edges 16, 17, 17' are readily extendable away from one another under an externally applied force sufficient to overcome the bias imparted by the fill monofilament core 30 to at least partially open and expose the cavity 20. Accordingly, the elongate member 14 can be readily disposed into the cavity 20 during assembly or removed from the cavity 20 during service. Upon releasing the externally applied force, the edges 16, 17, 17' return automatically to their naturally biased, overlapping self-wrapped position under the bias imparted by the heat-set fill monofilament core 30.

During construction, after weaving the wall 12, the wall 12 is wrapped into a curled configuration to bring the opposite edges 16, 17, 17' into overlapping relation with one another. Then, suitable heat is applied to the wall 12 to cause the fill monofilament core 30 to be heat-set, thereby retaining a permanently curled configuration. As such, upon being heat-set, the monofilament core member 30 causes the wall 12 to automatically curl into its self-curled configuration about the central axis 18, absent some external force sufficient to overcome the curl bias force imparted by the heat-set monofilament core 30.

Figure 4:
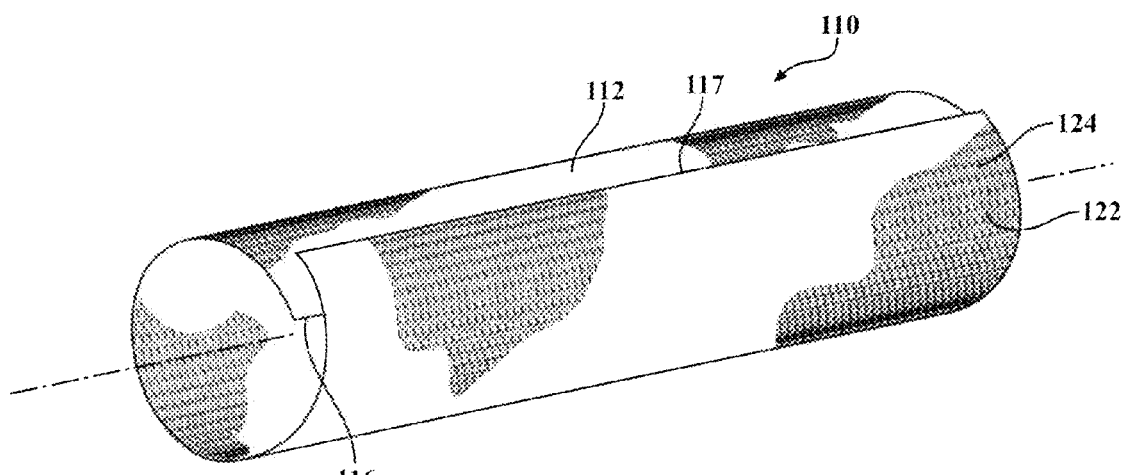
FIG. 4 is a schematic perspective view of a woven, self-wrapping sleeve constructed in accordance with another aspect of the invention.

As shown in FIG. 4, a sleeve 110 constructed in accordance with another aspect of the invention is shown, wherein the same reference numerals as used above, offset by a factor of 100, are used to identify like features. The only difference between the sleeve 110 and the sleeve 10 discussed above is that the sleeve 110 has a single wall 112. The wall 112 extends widthwise between opposite ends 116, 117, wherein upon completing construction, the ends 116, 117 are automatically biased into overlapping relation with one another. The same warp yarns 122 and hybrid fill yarn 124 are used to construct the sleeve 110. Accordingly, aside from having a single wall, the sleeve 110 is the same as the previously described sleeve 10.

In accordance with another aspect of the invention, a method of constructing a textile sleeve 10, 110 having the structure discussed above is provided. The method includes weaving an elongate wall 12, wherein the wall 12 in the embodiment of FIGS. 1-3 is shown having first and second layers 26, 28 woven continuously with one another using the same yarn and weave pattern to form the inner and outer layers overlying one another. The overlying layers 26, 28 are connected to one another via the weaving process along a common interior edge 16 and extend parallel to one another to outer free edges 17, 17'. In further accordance with the method, the weaving can be performed on a loom with the assistance of a "dual end for a single head" attachment. Otherwise, for the sleeve 110 shown in FIG. 4, the method includes weaving an elongate single layer wall 112.

In accordance with the invention, the method further includes providing the fill yarns 24 having a yarn filament core 30 and non-metallic, non-conductive first and second yarn filaments 32, 34 overlying the yarn filament core 30. The first yarn filament 32 is twisted about the yarn filament core 30 in a first helical direction (S or Z) and the second yarn filament 34 is twisted over the first yarn filament 32 and about the yarn filament core 30 in a second helical direction (S or Z), whichever is the opposite direction to the twist of the first yarn filament 32, such that the first helical direction and the second helical direction are opposite one another. The method further includes twisting the first yarn filaments 32 about the yarn filament core 30 a first number of turns per inch and twisting the second yarn filaments 34 about the yarn filament core 30 a second number of turns per inch, wherein the first number of turns per inch is greater than the second number of turns per inch. The relation of twisting between the first and second yarns 32, 34 creates a zero resultant torque about the core filament 30.

The method further includes providing the yarn filament core 30 as a heat-settable thermoplastic monofilament and providing the first and second yarns as multifilaments. To further enhance the performance of the wall 12, by preventing relative slippage between the warp filaments 22 and the fill filaments 24, the method further includes texturizing the first and second multifilaments 32, 34.

Upon weaving the dual layer wall 12, the method includes wrapping the dual layers 26, 28 into a tubular configuration to bring the opposite edges 16, 17, 17' into overlapping relation with one another. Then, the method includes applying suitable heat to the wall 12 to cause the fill monofilament core 30 to be heat-set in a permanently curled configuration, thereby causing the wall 12 to retain a self-curling configuration about the central axis 18. Otherwise, if the wall 112 is a single layer, as shown in FIG. 4, the same heating process is performed to provide the wall 112 with a self-curling configuration.

Obviously, many modifications and variations of the present invention are possible in light of the above teachings. It is, therefore, to be understood that within the scope of the appended claims, the invention may be practiced otherwise than as specifically described.

What is claimed is:

1. A textile sleeve for routing and protecting elongate members, comprising:
   an elongate wall having opposite edges extending parallel to a central axis of the sleeve, said wall being woven with warp yarns extending parallel to said axis and hybrid yarns woven only as fill yarns extending transversely to said warp yarns, said hybrid fill yarns being provided having a yarn filament core and non-metallic first and second yarn filaments overlying said yarn filament core, said first yarn filament being twisted about said yarn filament core in a first helical direction and said second yarn filament being twisted over said first yarn filament and about said filament core in a second helical direction, said first helical direction and said second helical direction being opposite one another.

2. The textile sleeve of claim 1 wherein said yarn filament core is a thermoplastic monofilament.

3. The textile sleeve of claim 2 wherein said first and second yarn filaments are multifilaments.

4. The textile sleeve of claim 3 wherein said multifilaments are texturized.

5. The textile sleeve of claim 2 wherein said thermoplastic monofilament biases said wall into a self-curled configuration about said central axis.

6. The textile sleeve of claim 5 wherein said opposite edges are biased by said thermoplastic monofilament in overlapping relation with one another.

7. The textile sleeve of claim 1 wherein said first yarn filaments are twisted having a first number of turns per inch about said yarn filament core and said second yarn filaments are twisted having a second number of turns per inch about said yarn filament core, said first number of turns per inch being greater than said second number of turns per inch.

8. The textile sleeve of claim 1 wherein said wall includes an inner layer and an outer layer overlying said inner layer, said inner layer and said outer layer having said warp yarns extending parallel to said axis and said fill yarns extending transverse to said warp yarns and having the same weave construction.

9. A method of constructing a textile sleeve, comprising:
   weaving an elongate wall having opposite edges extending parallel to a central axis of the sleeve with single filament warp yarns extending parallel to the axis and hybrid fill yarns extending transversely to the warp yarns; and
   providing only the fill yarns as the hybrid yarns, with the hybrid yarns having a yarn filament core and non-metallic first and second yarn filaments overlying the yarn filament core, the first yarn filament being twisted about the yarn filament core in a first helical direction and the second yarn filament being twisted over the first yarn filament and about the yarn filament core in a second helical direction, the first helical direction and the second helical direction being opposite one another.

10. The method of claim 9 further including providing the yarn filament core as a thermoplastic monofilament.

11. The method of claim 10 further including providing the first and second yarn filaments as multifilaments.

12. The method of claim 11 further including providing the multifilaments as texturized multifilaments.

13. The method of claim 10 further including heat-setting the thermoplastic monofilament to bias the wall into a self-curled configuration about the central axis.

14. The method of claim 9 further including twisting the first yarn filaments about the yarn filament core having a first number of turns per inch and twisting the second yarn filaments about the yarn filament core having a second number of turns per inch, the first number of turns per inch being greater than the second number of turns per inch.

15. The method of claim 9 further including weaving the wall having an inner layer and an outer layer overlying the inner layer with the inner layer and the outer layer having the same weave construction.

16. The method of claim 15 further including weaving the wall on a loom.

17. A textile sleeve for routing and protecting elongate members, comprising:
   an elongate wall having opposite edges extending parallel to a central axis of the sleeve, said wall being woven with warp yarns extending parallel to said axis and hybrid fill yarns extending transversely to said warp yarns, said hybrid fill yarns being provided having a yarn filament core and non-metallic, non-conductive first and second yarn filaments overlying said yarn filament core, said first yarn filament being twisted about said yarn filament core in a first helical direction and said second yarn filament being twisted over said first yarn filament and about said filament core in a second helical direction, said first helical direction and said second helical direction being opposite one another.

18. The textile sleeve of claim 17 wherein said first and second yarn filaments are texturized multifilaments.

* * * * *